United States Patent [19]
Osheroff

[11] 3,730,430
[45] May 1, 1973

[54] THERMOVALVE
[75] Inventor: Gene W. Osheroff, Las Vegas, Nev.
[73] Assignee: Fluidtech Corporation, Inglewood, Calif.
[22] Filed: July 6, 1971
[21] Appl. No.: 159,626

[52] U.S. Cl. ............... 236/101, 236/87, 137/625.18
[51] Int. Cl. ............................................. G05d 23/08
[58] Field of Search ..................... 236/87, 101, 12; 137/625.18, 625.4; 251/368, 284

[56] References Cited
UNITED STATES PATENTS

| 3,411,711 | 11/1968 | O'Hara et al. | 236/87 |
| 3,556,136 | 1/1971 | White | 251/368 X |
| 3,610,285 | 10/1971 | Passaggio | 137/625.66 |
| 2,499,496 | 3/1950 | Grimes et al. | 137/625.4 X |
| 3,095,896 | 7/1963 | Ross | 251/284 X |
| 2,225,210 | 12/1940 | Dillon | 236/12 |

Primary Examiner—William E. Wayner
Attorney—Allen E. Botney

[57] ABSTRACT

The present invention provides a thermostatically-controlled valve that is very sensitive and, therefore, very responsive to changing temperature conditions. The device comprises a coiled bi-metal strip fixed at one end and whose other end is coupled to a flat plate. The plate rests on a member containing a pair of orifices that are covered or uncovered by the plate as it moves horizontally under the rotational motion of the bi-metal strip. The sensitivity of the device is due to the fact that the plate barely loads the coil.

7 Claims, 5 Drawing Figures

PATENTED MAY 1 1973 3,730,430
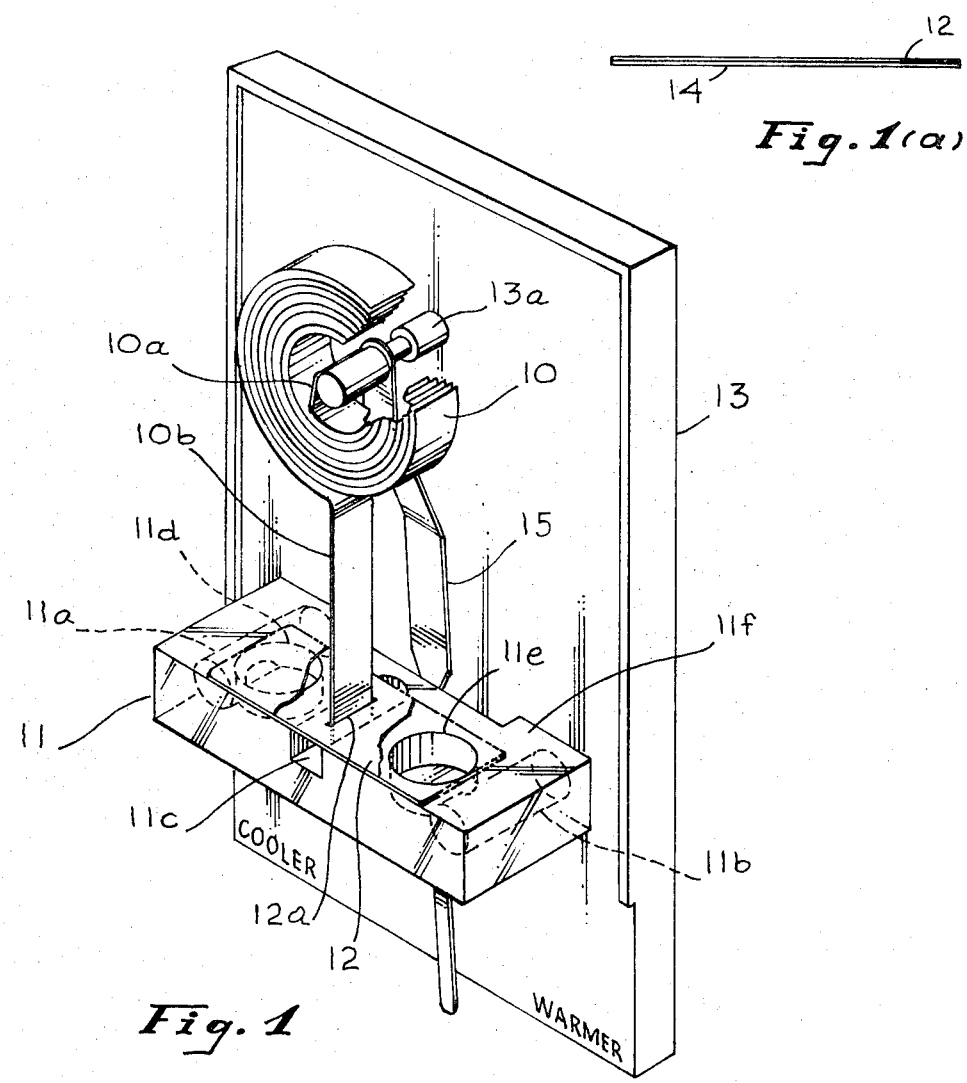
Fig.1(a)
Fig.1
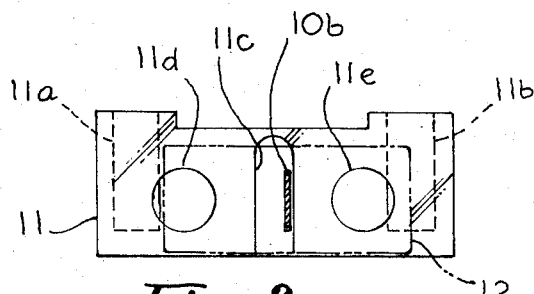
Fig.2
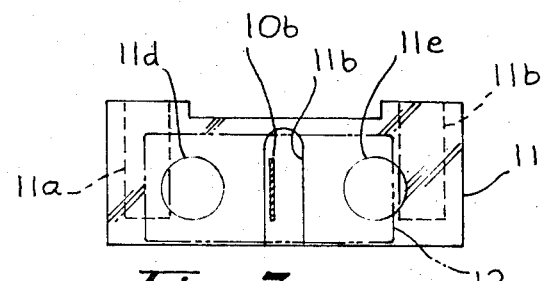
Fig.3
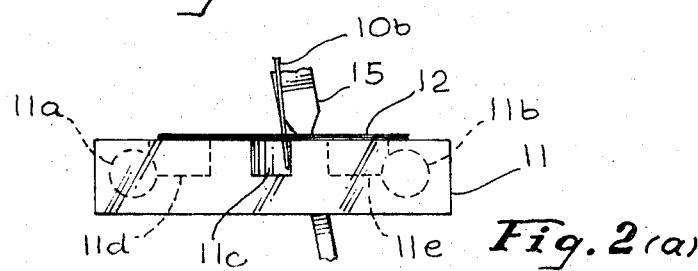
Fig.2(a)
INVENTOR
GENE W. OSHEROFF
BY Allen E. Botney
ATTORNEY

THERMOVALVE

The present invention relates in general to thermostatically-controlled devices known as thermovalves, and more particularly relates to a thermovalve of relatively simple construction and greatly improved sensitivity.

One type of thermovalve device used in the prior art to open and close a pair of air valves under the control of a temperature-sensitive element is illustrated in the patent application filed Dec. 28, 1970, by Gene W. Osheroff entitled "Fluidic Apparatus For Air-Conditioning Systems" and having Ser. No. 101,901, now U.S. Pat. No. 3,680,776. As described therein, the thermovalve includes a coiled bi-metallic strip that moves in either a clockwise or counterclockwise direction according to the changes in the ambient temperature conditions. As is customary in this kind of device, one end of the bi-metallic strip is fixed in position at the center of the coil whereas the other end is free and, therefore, moves freely as the coil turns in one direction or the other. The referred-to thermovalve also includes a pair of leaf or cantilevered spring members that are integrally mounted on the free end of the bi-metallic strip, one on either side of it, with a pair of stops respectively mounted on the cantilevered members.

In this prior art device, the free end of the bi-metallic strip extends between a pair of air valves and with the strip in its normal or midway position therebetween, the stops completely close both valves. However, one or the other of the air valves is opened as the strip and, therefore, the cantilevered members, moves in one direction or the other. Of course, no air can pass through either of the valves when they are both closed by the stops. On the other hand, the amount of air passing through a valve when it is open is determined by the extent to which the stop has been removed from the valve, that is to say, the restriction that still exists, and this, in turn, is determined by the extent to which the bi-metallic strip has moved in response to the changes that have taken place in the ambient temperature conditions.

Although the thermovalve identified hereinabove did the job it was intended to do, it nevertheless had a number of disadvantages associated with it. Thus, for example, due to the fact that the cantilevered elements and the stops thereon were mounted on the free end of the bi-metallic strip, the strip was thereby loaded down, which means that the thermovalve responded or reacted relatively slowly to changes in temperature conditions. Again by way of example, with continued use the stops would tend to become somewhat misaligned with the valve openings, with the result that undesirable variations would occasionally be introduced in the operation of the equipment serviced by the thermovalve. The necessary alignment of the stops with the valve openings was also a problem because the stops actually moved in an arc between them, so that quality control was an important factor in the manufacture of these thermovalves.

The present invention overcomes these and other disadvantages of this prior art thermovalve and it does so by eliminating the cantilevered elements and the stops mounted thereon and substituting instead a flat plate that is coupled to the free end of the bi-metallic strip but not an integral part of it. The plate rests on the surface of a member in which the air valves are located and, in accordance with the present invention, it moves or slides horizontally over the valve openings, which means that the rotational motion of the bi-metallic strip is translated into a rectilinear motion, a decided advantage. Furthermore, since the weight of the plate is fully supported by the valve member and since the coefficient of friction between the plate and member is intentionally reduced to a very low valve, such as by coating a layer of teflon on the underside of the plate, there is extremely little loading on the bi-metallic strip during its operation. As a result, a thermovalve according to the present invention is very sensitive to temperature changes and reacts or responds rapidly to them. It should also be mentioned that since the plate moves rectilinearly, the plate being the means by which the air valves are opened and closed, the problem of alignment is eliminated.

It is, therefore, an object of the present invention to provide a fast acting, reliable thermovalve of relatively simple construction.

It is an additional object of the present invention to provide a thermovalve that responds more rapidly to temperature changes.

It is another object of the present invention to provide a thermovalve in which the alignment of parts is not a factor either in its manufacture or operation.

It is a further object of the present invention to provide a thermovalve in which the motion of the member opening and closing the valves is rectilinear.

The novel features which are believed to be characteristic of the invention, both as to its organization and method of operation together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

FIG. 1 is a perspective view of a preferred embodiment of a thermovalve according to the present invention, and shows it's bi-metallic element in a neutral or center position in which both air valves are closed;

FIG. 1(a) is an edge view of the plate in the FIG. 1 embodiment showing its construction;

FIG. 2 is a top view of only the valve portion of the FIG. 1 device and illustrates the bi-metallic element in one extreme position, thereby exposing one of the valve openings to the fullest extent;

FIG. 2(a) is a front view of the portion of the thermovalve illustrated in FIG. 2; and FIG. 3 is again a top view of the valve portion and illustrates the bi-metallic element in the other extreme position, thereby exposing the other of the valve openings to the fullest extent.

For a consideration of the invention in detail, reference is now made to the drawing wherein, in FIG. 1, an embodiment of the invention is shown to basically include a coiled bi-metallic strip 10, a valve member 11 and a plate 12, the coiled strip being the thermal or temperature-sensitive portion of the device and the member and plate together constituting the valve portion. Coil 10 is mounted on a wall, designated 13, of the structure that houses the thermovalve and this is accomplished by rigidly fixing one end of the strip, namely, end 10a located at the center of the coil, to a rod or shaft 13a protruding from the wall, the other end of the strip, hereinafter occasionally referred to as free end 10b, extending downwardly from the body of the coil. Coiled bi-metallic strip 10 is of the kind found in many thermostatic or temperature-sensitive devices in the market place and, hence, is a standard type of element.

Member 11 is a solid block of material having a pair of valve orifices 11a and 11b extending through it and a trough-like slot 11c located between the orificies. The openings leading into orifices 11a and 11b, respectively designated as entrance ports 11d and 11e, are located in surface 11f which is preferably a flat surface and the one nearest, that is to say, the one closest to coil 10. Slot 11c is also located in surface 11f and is preferably located just midway between the two entrance ports. Orifices 11a and 11b, including their entrance ports, are preferably identical to one another and slot 11c is preferably of a symmetrical configuration. Member 11 is also mounted on wall 13, the spacing between it and the coil above it being such as to permit free end 10b to extend downwardly into slot 11c.

Finally, as to plate 12, plate 12 is a thin, light plate that slidably rests on surface 11f. Since surface 11f is flat, plate 12 is also flat and, as may be seen from the figure, it has a narrow slit 12a through which free end 10b extends. Thus, plate 12 is coupled to strip 10 but not integrally joined to it. Stated differently, the only coupling between plate 12 and bi-metallic strip 10 is that of the strip passing through slit 12a and since the weight of plate 12 is entirely supported by member 11, the result is that the load on the bi-metallic strip is reduced to practically zero. Needless to say, as a result of the aforedescribed coupling, plate 12 is also prevented from falling off the surface of member 11. As for the dimensions of plate 12, its length and width are sufficient to cover entrance ports 11d and 11e when free end 10b is centered in slot 11c. However, in order to increase the sensitivity of the thermovalve to a maximum and thereby decrease its reaction or response time to a minimum, it is preferable to have the plate just barely cover the entrance ports when the free end of the bi-metallic strip is centered in the slot. In this way, as will be seen later, the slightest movement of the plate will partially uncover one or the other of the entrance ports.

For the purpose of further enhancing the rapidity with which an embodiment of the present invention responds to changes in ambient temperature conditions, the thermovalve preferably further includes means to reduce the friction between member 11 and plate 12. One way in which this can be done is shown in FIG. 1(a) where the plate is shown coated on its bottom side with a layer of material 14 that has a low coefficient of friction, such as Teflon. Another way is to fabricate member 11 out of such a material or, at the very least, coat surface 11f with it. Of course, if it is desirable, a combination of both ways may be employed.

Last but not least, the thermovalve shown in FIG. 1 includes the usual temperature-setting lever 15 by means of which the coil can be biased so as to set the temperature of the thermovalve above or below the ambient temperature for the control of whatever equipment may be coupled to it, such as an air-conditioning system. As shown in the figure, lever 15 is coupled to coil 10 at end 10a and extends downwardly between member 11 and wall 13, the bottom end of the lever extending below the level of wall 13b to provide easy manual access to the user.

Finally, although the materials from which member 11 and plate 12 are made are really a matter of design and economics rather than invention, it is nevertheless deemed worthwhile to mention that both member 11 and plate 12 can be made from any one of a number of suitable materials. Thus, for example, member 11 can be molded out of any sturdy and inexpensive plastic, whereas plate 12 can be made of a plastic or a metal. Aluminum has already been used in the manufacture of plate 12 and found to be satisfactory.

Considering now the operation of the thermovalve, when bi-metallic coil 10 is in what may be called its quiescent position, that is to say, when its free end 10b is centered in slot 11c, entrance ports 11d and 11e are both covered by plate 12, with the result that no air, or any other gas for that matter, can get through orifices 11a and 11b. The valve is then totally closed. The FIG. 1 thermovalve is in this kind of condition when the temperature at which it is set is the same as the ambient temperature.

However, when the thermovalve is set at a temperature that is higher than the ambient temperature as, for example, by moving lever 15 to the warmer temperature markings, the coil and, therefore, free end 10b rotates in either a clockwise or counterclockwise direction depending on how the thermovalve is designed. Assuming that end 10b moves in a counterclockwise direction, then in that event plate 12 moves linearly along surface 11f to the right, thereby partially opening or exposing entrance port 11d. Plate 12 continues to move to the right in response to the motion of end 10b until end 10b abuts against the side or wall of slot 11c, as is shown in FIGS. 2 and 2(a). At this point, end 10b and plate 12 coupled to it can move no further and, therefore, entrance port 11d is now open to the maximum extent. The reverse process takes place as the ambient temperature rises toward the temperature setting of the thermovalve. Thus, as the ambient temperature rises, end 10b moves more and more toward the center of slot 11c and, correspondingly, plate 12 ever increasingly covers over entrance port 11d. It will be recognized that when the ambient temperature reaches the temperature setting of the thermovalve, end 10b will again be at the center of slot 11c and entrance port 11d will again be completely covered by plate 12. The thermovalve is now once again in its quiescent condition.

On the other hand, when the thermovalve is set at a temperature that is lower than the ambient temperature, as by moving lever 15 to the cooler temperature settings, coil 10 and, therefore, end 10b moves in a clockwise direction. When this occurs, plate 12 moves linearly along surface 11f to the left, thereby partially opening entrance port 11e. As before, plate 12 will continue to move in this direction until end 10b abuts against the opposite wall or side of slot 11c, at which point entrance port 11e is open to the maximum extent. Needless to say, as the ambient temperature approaches the temperature setting of the thermovalve, end 10b moves even further away from the wall of the slot until, when the temperatures are equal, it will have reached the center of the slot. At this point, the thermovalve is again in its quiescent condition, which means that both entrance ports are again completely covered by plate 12.

It will be recognized by those skilled in the art that the maximum extent to which the entrance ports are opened or uncovered by the plate depends not only on the size or dimensions of these openings but on the width of the slot as well. It will also be recognized that the rotational motion of coil 10 and, therefore, of end 10b, has been converted or translated into the rectilinear motion of plate 12.

Although a particular embodiment of the invention has been described hereinabove, it is not in any sense intended to mean that the invention is limited thereto. More particularly, various modifications and alterations can be made in and to this embodiment and yet the thermovalve would still fall within the scope of the invention. For example, it may be desirable in some instances or applications to mount coil 10 beneath member 11 instead of above it as in FIG. 1. In such a case, slot 11c would be extended all the way through member 11 so as to divide it into two equal parts. End 10b would then extend upwards through slot 11c to couple as it did before with plate 12. Accordingly, a thermovalve based on the present invention includes all modifications, variations and alterations falling within the scope of the annexed claims.

Having thus described the invention, what is claimed is:

1. A thermovalve comprising: a housing wall; a member having a pair of valving orifices therethrough mounted on one surface of said wall, the top surface of said member being flat with the entrance ports to said orifices lying in said top surface, said member including a slot located between said entrance ports that extends downward from said top surface only partially through said member, said wall including means for coupling the exit ports of said orifices through said wall to the other side thereof; a plate slidably resting on said top surface, the dimensions of said plate being sufficient to just completely cover both said entrance ports when said plate is centered therebetween, said plate having a slit therethrough between the ends thereof; and a coiled bi-metallic temperature-sensitive element mounted in the space above said plate, the center of said coil being fixedly coupled to said wall and the other end thereof being free and extending linearly downward through the slit in said plate and into said slot, the space between said plate and said element containing no other parts.

2. The thermovalve defined in claim 1 wherein the width of said slot is substantially equal to the sum of the widths of said entrance ports.

3. The thermovalve defined in claim 1 wherein said theremovalve further includes means for increasing the sensitivity of the thermovalve to changes in ambient temperature conditions, said means including friction-reducing means mounted between said plate and top surface.

4. The thermovalve defined in claim 1 wherein the location and dimensions of said slot are such that one of said entrance ports is covered and a predetermined portion of the other of said entrance ports is uncovered by said plate when the end of said temperature-sensitive element that extends into said slot abuts against one side thereof, and such that said other entrance port is covered and a predetermined portion of said one entrance port is uncovered by said plate when the end of said temperature-setting element that extends into said slot abuts against the other side thereof.

5. The thermovalve defined in claim 1 wherein the thermovalve further includes a mechanism mounted between said housing wall and said member for biasing said coiled bi-metallic element to pre-set the temperature of the thermovalve.

6. The thermovalve defined in claim 3 wherein said plate is coated with a friction-reducing substance on the side thereof facing said member.

7. The thermovalve defined in claim 4 wherein said entrance ports are of equal size and said slot is located midway therebetween, wherein said plate covers both said entrance ports when said other end of said bi-metallic strip is positioned midway between the sides of said slot, and wherein said plate just fully uncovers one or the other of said entrance ports as said other end of the bi-metallic strip respectively abuts against one or the other of the sides of said slot.

* * * * *